United States Patent [19]

Adkins et al.

[11] 3,815,105

[45] June 4, 1974

[54] PRIORITY INTERRUPT SYSTEM

[75] Inventors: William J. Adkins; Charles N. Carter, both of Raleigh, N.C.

[73] Assignee: Corning Glass Works, Corning, N.Y.

[22] Filed: Sept. 26, 1973

[21] Appl. No.: 400,914

[52] U.S. Cl. .............................................. 340/172.5
[51] Int. Cl. .............................................. G06f 9/18
[58] Field of Search .................................. 340/172.5

[56] References Cited

UNITED STATES PATENTS

| | | | |
|---|---|---|---|
| 3,336,582 | 8/1967 | Beausoleil et al | 340/172.5 |
| 3,599,162 | 8/1971 | Byrns et al | 340/172.5 |
| 3,638,198 | 1/1972 | Balogh, Jr. | 340/172.5 |
| 3,701,109 | 10/1972 | Peters | 340/172.5 |
| 3,719,930 | 3/1973 | Horoshima | 340/172.5 |

*Primary Examiner*—Paul J. Henon
*Assistant Examiner*—Paul R. Woods
*Attorney, Agent, or Firm*—Walter S. Zebrowski

[57] ABSTRACT

A computer priority interrupt system minimizes the computer time required to service the request of peripheral equipment. The interrupt system is priority structured with an interrupt identifier circuit which identifies the peripheral requesting service without requiring polling of all peripheral units. Priority interlocked gates, one associated with each peripheral unit, are connected in series in the order of priority. Request signals from lower priority peripheral units are passed through the interlock gate when the gates are enabled. Bistable circuitry associated with each peripheral unit blocks transmission of request signals from equal or lower priority units when the bistable circuitry is set. An encoder generates a code identifying the peripheral unit being serviced. This obviates the requirement for polling to determine which unit is being serviced.

4 Claims, 3 Drawing Figures

PRIORITY INTERRUPT SYSTEM

BACKGROUND OF THE INVENTION

This invention relates to computer priority interrupt systems and more particularly to such a system having an interrupt identifier circuit.

Small digital computers are increasingly used to control and coordinate the functions of systems which include a number of peripheral devices. One example of such a system is a system for automatically counting and classifying the blood cells on a blood smeared slide. A thesis by J. W. Bacus, "An Automated Classification of the Peripheral Blood Leukocytes by Means of Digital Image Processing", University of Illinois, Chicago, 1971 describes one automated system for analyzing blood samples. In such a system it is convenient to use a so-called mini-computer to control the equipment required to perform the blood analysis and to accumulate the data from that system.

Computers are capable of transferring data to, and receiving data from, a large number of peripheral devices. A logical circuit called an interface is the means by which this data interchange is accomplished. The interface may take many forms depending upon the task to be performed, but all have one thing in common — that is to synchronize data interchange between the computer and one or more peripheral devices external to the computer.

The simplest form of prior art computer interface is one which operates under program control. This interface utilizes software to synchronize it with the peripheral device. The program requests data from the external device, determines when data transmission is complete, and, in general, every exchange of data made by the interface is done under control of the software program. Such a simple interface must necessarily derive its usefulness by utilizing large amounts of computing time. This time spent controlling the interface is time not spent performing calculations on the data received from the peripheral device.

A typical example of a program-controlled interfacing operation might be to type a character on a teleprinter. In this operation, it is necessary to sample a flag or indicator at rapid intervals to see if a key has been pressed on the teleprinter keyboard. When a key is pressed, the flag is set and a read-in operation is begun. The code for the key is read, stored in memory, and a command is issued to the interface to send this code to the teleprinter punch mechanism. Since the teleprinter punch is much slower than the computer, another flag is set to indicate that data output is under way. This flag must now be continually sampled until the character is punched, at which time the flag is cleared and the computer is released to perform other tasks.

This whole operation of looking for data from and transferring data to the teleprinter takes a great amount of time. Typical teleprinters operate at 10 character per second; therefore, this example could take place once every 0.1 sec. Since a typical computer cycle time is one operation every 1.2 μsec., a net loss of 99,998 μsec. or more than 83,000 computer operations results from waiting for the teleprinter to complete its operation. This large loss of the available number of computer operations is quite tolerable in cases where only a few external devices are being controlled or where processing need not continue while external devices are being controlled. However, in a system such as the one used for blood cell classification, it's desirable to utilize as much of the available computer time as possible to complete the hundreds of thousands of calculations necessary to classify a blood cell. Therefore, the program-controlled interface is impractical for use in this system to control peripheral functions.

Another type of interface in use today can be referred to as an interrupt type interface. Such an interface is present, for example, in the computers manufactured by the Digital Equipment Corporation, for example, the PDP/8M computer.

An interrupt-type interface takes better advantage of the computer's speed by not forcing it to wait for external operations to be completed before going on with internal calculations. An interrupt interface allows an external device to interrupt the normal program flow just long enough to satisfy the immediate needs of the device. This leaves the computer free to do normal calculations instead of waiting until the external request has been completely satisfied.

In the case of the teleprinter, much more efficiency could be derived by using an interrupt interface. When a key on the keyboard is pressed, an interrupt occurs, requesting service from the computer. The computer recognizes this request and services the keyboard by reading the key encoding and echoing this back to the teleprinter immediately. The whole operation may take only 10 to 15 computer cycles to complete before the computer can return to its normal programmed operations. This type of operation allows the computer to utilize those 83,000 operations that were lost when operating under program control.

The interrupt control interface may also contain many different priority levels. These priority levels dictate which external device gets serviced first in the case of two interrupts occurring together. It is standard practice to arrange priorities such that the high-speed devices have high priorities and the lower speed devices have low priorities. A simple example may involve a magnetic tape drive, a line printer, and a teleprinter. The magnetic tape drive has data transfer rates in the neighborhood of 24,000 transfers per second; the line printer runs at 200 transfers per second, and the teleprinter at 10 transfers per second. Here, the priorities would be set up with the magnetic tape having the highest priority. The line printer would have second priority, and the teleprinter would have the lowest priority. This means that if the line printer and teletype both asked for service at the same time, the line printer would be serviced first, then the teleprinter.

The actual means by which the computer receives the signal that a peripheral device needs servicing is via the interrupt request bus. This bus is shared by all peripherals and when asserted by an interrupt, causes the computer to branch from normal program processing to an interrupt service routine. The computer must acknowledge the interrupt request and then find out which peripheral actually made the request.

The process used by the computer to find out which peripheral has interrupted is called polling. The polling process involves interrogating each interrupt request circuit or module until a positive response is received. The computer services the interrupting peripheral and clears the interrupt request. However, when two or more interrupts occur one after the other, the polling process can become cumbersome. Since it is known that higher priority interrupts must be serviced first, it is necessary that all interrupts be polled immediately to establish whether or not the new interrupt is of higher priority than the one presently being serviced. If it is, it must be serviced before completing the present service routine. If the new interrupt is of a lower priority, servicing of the present interrupt may continue until finished before starting on the new interrupt.

The process of polling after each interrupt is received can become quite time consuming, especially when several high speed peripherals are interfaced to the computer. For instance, assume 20 devices are interfaced under interrupt control. Each time an interrupt accurs, approximately 50 computer cycles are necessary to poll all the modules. And if, during the polling process, another interrupt accurs, and then another, and another, it is conceivable that the computer could be completely tied up just polling the interrupt modules with no time left to service the modules much less perform calculations on the data received from the peripherals.

SUMMARY OF THE INVENTION

In accordance with this invention the priority interrupt system for a computer which controls a plurality of peripheral units includes an encoder which generates a code identifying the peripheral unit being serviced. This interrupt is priority structured so that only the request signal from the highest priority peripheral requesting service is acknowledged by the computer. Upon this acknowledgement, the code identifying the peripheral being serviced is transmitted to the computer. After a peripheral unit has been serviced, a clear pulse is transmitted from the computer back through the priority interrupt circuitry. The clear pulse is transmitted through the circuitry associated with peripheral units having higher priority than the one which was serviced. In this manner, the request from the peripheral unit which was serviced is cleared, but lower priority requests, which have not yet been serviced, are preserved.

The computer interface of this invention takes advantage of the speed of an interrupt-request-type interface with two major improvements. The inclusion of an interrupt identifier circuit eliminates the problem of polling after each interrupt. This allows a simple one-step read-in command which identifies the interrupting peripheral unit. A priority chain eliminates lower priority interrupts from occurring until the servicing of a higher priority interrupt has been completed. These two improvements allow a high utilization of the speed of the computer.

The foregoing and other objects, features and advantages will be better understood from the following more detailed description and appended claims.

DESCRIPTION OF THE PREFERRED EMBODIMENT

Figure 1:
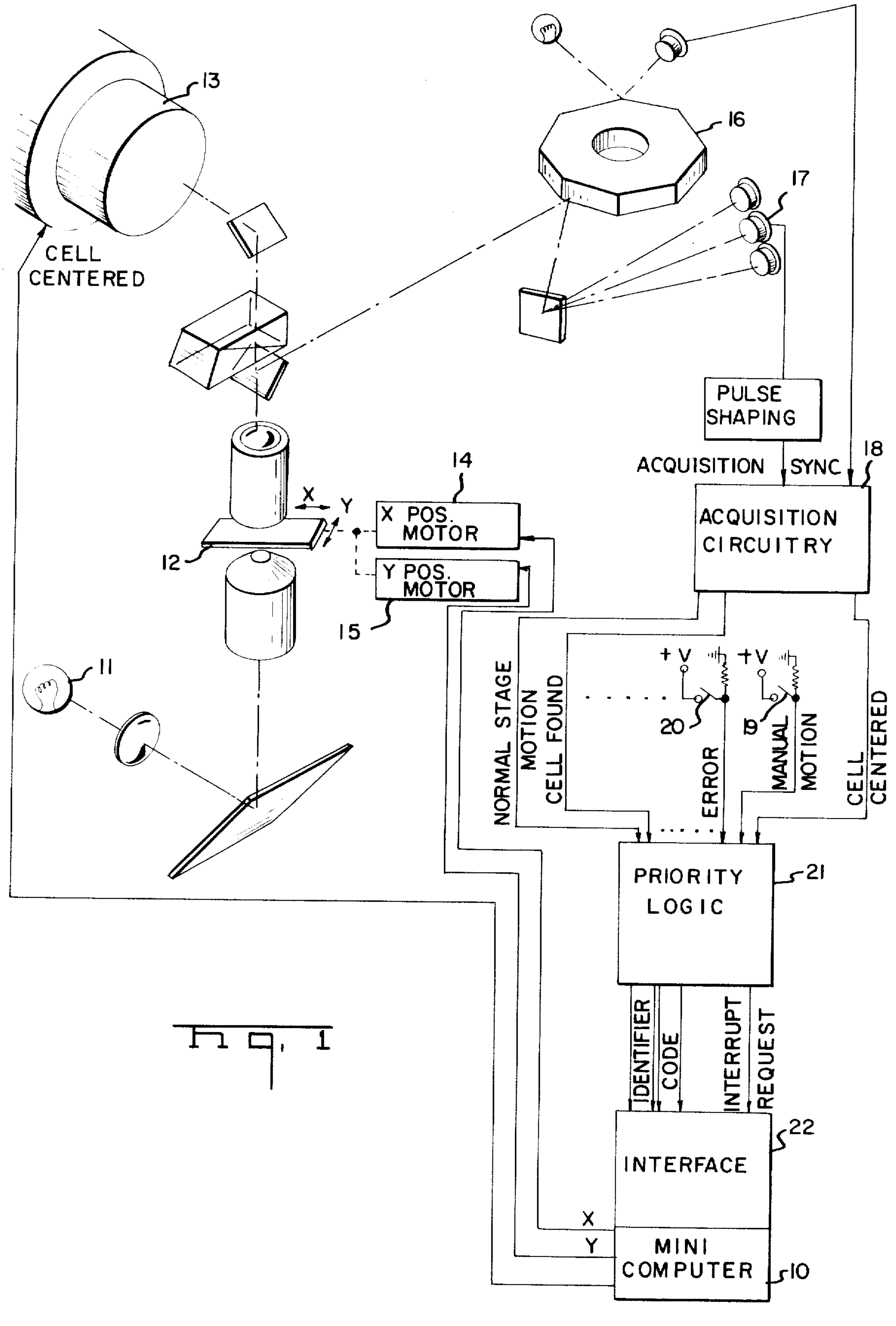
FIG. 1 is a block diagram of the peripheral units and the computer in a blood cell analysis system.

FIG. 1 depicts a blood cell analysis system and it is a typical system in which a small digital computer 10 controls the equipment in the system. In such a system light from a source 11 passes through a blood smeared slide 12 and forms an image of a blood cell on the slide. This image is projected to a convertor 13 which converts the optical image of the blood cell into electrical signals representing the characteristics of the blood cell. A vidicon type television camera typically scans the image of the blood cell and the resultant signals are converted to digital words which are stored in the computer 10. The scanning and conversion to digital words is more fully described in copending application Ser. No. 353,004, filed Apr. 20, 1973 — Douglas A. Cotter. One of the control functions which the computer 10 must perform is to supply pulses to positioning motors 14 and 15 which position the slide 12 to center a blood cell in the field of view of the convertor 13. When a cell is centered in the field of view, a cell-centered signal is applied to the convertor 13 which then proceeds with the conversion of the centered image into an electrical output. The system which produces signals representing the positioning of blood cells on the slide 12 is more fully described in copending application Ser. No. 400,915 filed Sept. 26, 1973, Adkins.

Briefly, this acquisition system includes a rotating mirror 16 which reflects light from the image of the slide to the photodetector 17. As the mirror 16 rotates, a portion of the slide image is scanned across the photodetector 17. The photodetector responds to light and dark changes in the scanned image to produce an acquisition signal. The acquisition circuitry 18 responds to this acquisition signal, and to a synchronizing signal, to produce request signals which are transmitted to the computer 10 to initiate the servicing of peripheral equipment. For example, computer 10 controls the convertor 13 and the positioning motors 14 and 15 in response to request signals from the acquisition circuitry. When the acquisition circuitry 18 determines that a blood cell is centered on the field of view of the convertor 13, a cell-centered request signal is transmitted to the computer. In the system being considered this signal has the highest priority. In response to this signal the computer 10 applied a signal to the convertor 13 causing it to convert the image focused on its field of view.

The acquisition circuitry 18 may determine that a blood cell was detected during a scan, but that it was not centered in the scan. In this case the acquisition circuitry produces a cell found signal which is applied as a request signal to the digital computer 10. In response to this signal the computer 10 supplies pulses to the *x* positioning motor 14 to position the slide 12 toward a position at which the detected blood cell is centered. The acquisition circuitry 18 produces a normal stage motion signal when no blood cell is found during a particular scan. This request signal causes the computer 10 to supply pulses to the *y* positioning motor 15 which positions the slide so that another portion is scanned.

In addition to the acquisition request signals, there are other requests which the computer 10 must service. Provision is made for manual motion of the slide 12. When switch 19 is closed a manual motion request signal is sent to the computer and this overrides all automatic positioning requests. When a limit switch 20 is closed, indicating that the slide motion is outside of its limits, an error signal is generated. This is applied as a request signal to the priority logic. It will be appreciated that other request signals will be generated by the system when various peripheral units require service. By way of example, the following is a listing of typical request signals in a blood cell analysis system and the priority order in which these request signals should be serviced.

| Priority Level | Request | Brief Description |
|---|---|---|
| 1. | Cell-Centered | This interrupt is issued each time a cell is centered in the T.V. aperture. The T.V. camera should be instructed to take a picture. |
| 2. | Manual Stage Motion | Interrupt occurs whenever the stage motion is used. |
| 3. | Error | Occurs when a stage motion limit switch is reached or during an out of focus condition. |
| 3. | Normal Pause | Occurs when PAUSE button is pressed. |
| 3. | Endrun | Occurs when ENDRUN switch is depressed. |
| 4. | Console Request | Occurs when any data key is pressed on the keyboard. |
| 5. | Run Request | Occurs when RUN button is depressed. |
| 6. | Cell Found | Occurs when the acquisition system has a cell within centering distance of the center aperture. |
| 7. | Normal Stage Motion | Causes interrupts at the spin mirror sync rate to control search motion of the stage. |
| 8. | Print Request | Occurs when the PRINT button is pressed. |

What has been described thus far is a typical computer control system which generates request signals and which has various peripheral units which must be serviced in response to these request signals. In accordance with this invention these request signals are applied through priority logic 21. This circuitry generates an interrupt request in response to the highest priority request signal. This interrupt request acts through a normal computer interface 22 to cause the computer to take the appropriate action. The priority logic 21 also generates an identifier code which identifies the unit which requires service. The priority logic 21 is shown in more detail in block diagram of FIG. 2.

Figure 2:
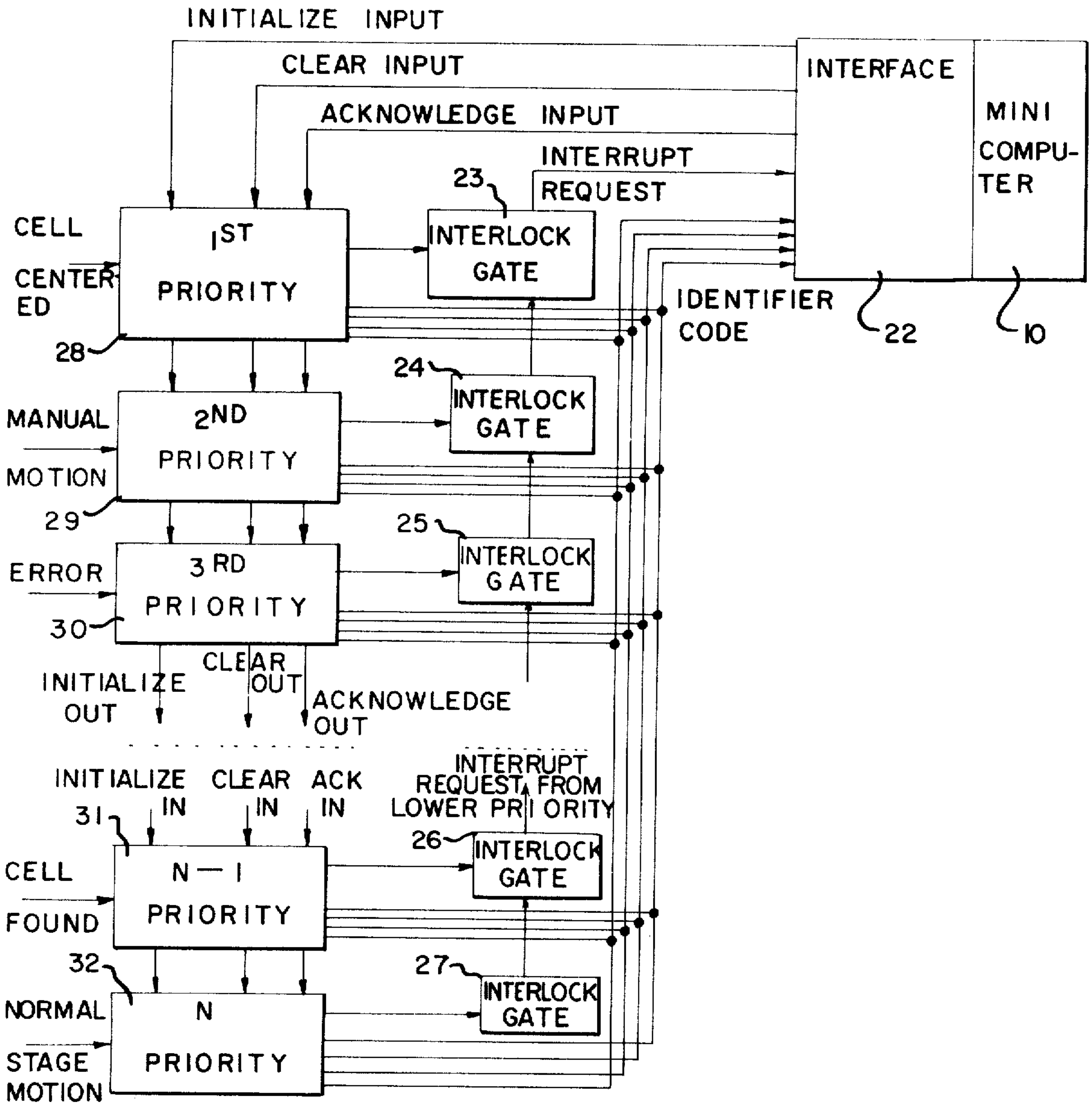
FIG. 2 is a block diagram of the priority logic of this invention.

Priority Logic, FIG. 2

The priority logic circuitry includes a plurality of interlocked gates 23–27. Each gate services one of the request signals. For example, interlock gate 23 services the cell-centered request, interlock gate 24 services the manual motion request and so on. The interlocked gates are connected in series in the order of priority. Request signals must pass through all of the gates of higher priority. For example, a normal stage motion request signal passes through interlock gates 27, 26, 25, 24 and 23 to generate an interrupt request which is applied to the computer 10.

The logic circuitry also includes a plurality of priority modules 28–32. Each priority module includes bistable circuitry which is set when there is a request signal. For example, bistable circuitry in the priority module 29 is set when the associated manual motion request signal occurs. In this case, the priority module 29 applies an interrupt request signal through interlock gate 24 and interlock gate 23 to the computer interface. Also, the priority module 29 blocks the interlock gate 24 so that request signals of lower priority cannot pass.

After the computer receives an interrupt request, it generates an acknowledge signal. This acknowledge signal is applied to the first priority modules 28. It is transmitted through successive priority modules until it reaches the priority module having a request signal applied thereto. Receipt of the acknowledge pulse at the module having a request for service causes that module to generate an identifier code.

Each of the priority modules 28–32 includes an encoder for generating an identifier code. The outputs of all encoders are connected through interface 22 to computer 10. The only identifier code which will be generated is the one identifying the request signal being serviced.

After the computer services the request signal it generates a clear signal. This clear signal is applied to the module 28 and thence to successive modules in the order of priority. The clear signal is effective to reset the bistable circuitry in the priority module which has been serviced. The clear signal is blocked from priority modules of lower priority. Therefore, these lower priority request signals can be serviced after completion of servicing of a higher order request.

Upon startup of the system, it is desirable to initialize all of the priority circuits to the same state. An initialize signal from the computer is transmitted to all of the priority modules to initially set them to the same states.

The operation can be better understood from the following description of one priority module and associated interlock gate.

Figure 3:
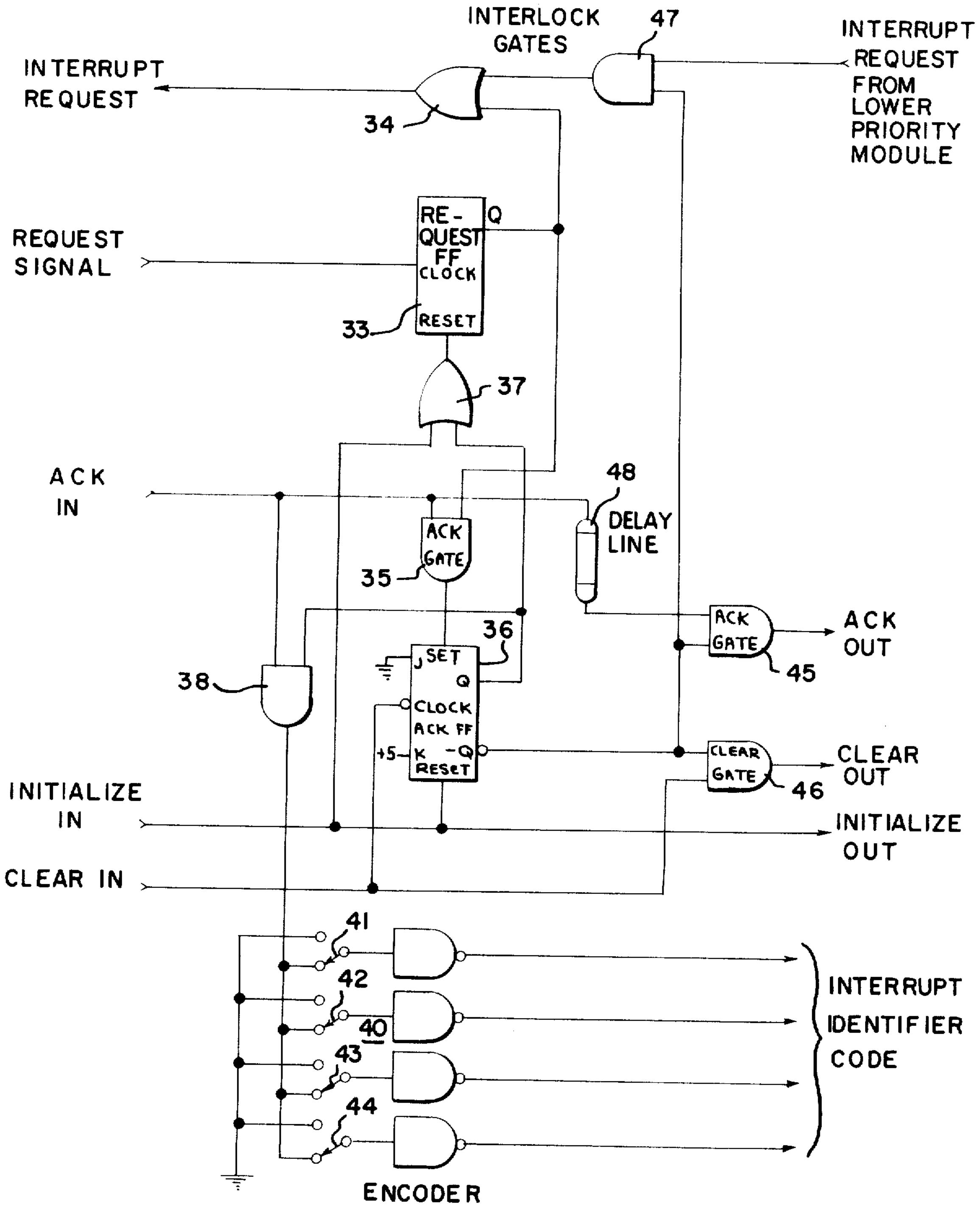
FIG. 3 is a schematic diagram of one priority module.

The Schematic Diagram of a Priority Module and an Interlock Gate, FIG. 3

The falling edge of a request signal sets the request flip-flop 33. The Q output of flip-flop 33 is applied through OR gate 34 to the interlock gate of the next highest priority module. This generates an interrupt request which is transmitted to the computer unless a higher priority request is being serviced.

The Q output of request flip-flop 33 enables the acknowledgement gate 35. When the computer acknowledges the interrupt request, it generates an acknowledgement pulse which is transmitted through the higher priority modules and passes through the acknowledgement gate 35. The acknowledgement flip-flop 36 is set by the leading edge of the acknowledgement pulse. The Q output of acknowledgement flip-flop 36 acts through the OR gate 37 to reset the request flip-flop 33. The Q output of flip-flop 36 also enables the AND gate 38. The trailing edge of the acknowledgement pulse passes through the gate 38 to enable the encoder 40. Encoder 40 includes programming switches 41–44 which are selectively set to encode an identifier signal which is unique to the request signal being serviced. In the position shown, a 1111 identifier code will be transmitted to the computer.

The Q output of acknowledgement flip-flop 36 is applied to another acknowledgement gate 45, to clear gate 46, and to the interlock gate 47. All three of these gates are blocked by the Q output of acknowledgement flip-flop 36. (In accordance with standard logic notation, the circle on the Q output indicates an inhibit.) Because the acknowledgement gate 45 and the clear gate 46 are blocked, acknowledgement and clear pulses are not transmitted to lower order priority modules. Since gate 47 is blocked, interrupt requests from lower order priority modules can not be transmitted to the computer until higher priority interrupts have been serviced.

A 70 μsec. delay line 48 delays the acknowledgement pulse long enough for acknowledgement flip-flop 36 to block the acknowledgement gate 45. This prohibits the acknowledgement pulse from passing to lower priority modules in the event that two interrupts occur simultaneously.

While a particular embodiment has been shown and described, modifications are within the true spirit and scope of the invention. The appended claims, are, therefore, intended to cover all such modifications.

What is claimed is:

1. A priority interrupt system for a computer which services peripheral units which generate request signals requesting service from said computer, which requests are to be serviced in a particular order of priority, said system comprising:

a plurality of priority interlock gates, one associated with each request signal to be serviced, said priority interlock gates being connected in series in said order of priority so that request signals from lower order priority interlocks are passed through said gates when said gates are enabled, a plurality of priority modules, one for each request signal to be serviced, each priority module including:

bistable circuitry which is set when there is an associated request signal, said bistable circuitry being connected to an associated interlock gate to block transmission of request signals from lower order priority interlocks when said bistable circuitry is set, and an encoder which generates a code identifying the request signal with which the priority module is associated, the outputs of said encoders being connected in parallel to said computer, and means for enabling only the encoder associated with the highest priority peripheral unit requesting service.

2. The system recited in claim 1 wherein said bistable circuitry includes a request flip-flop, a request signal from an associated peripheral unit being connected to set said request flip-flop, the output of said request flip-flop being applied to the associated interlock gate to transmit a request signal to said computer through higher priority interlock gates.

3. The system recited in claim 2 wherein said computer generates an acknowledgement signal in response to receipt of a request signal, and wherein said bistable circuitry further includes an acknowledgement flip-flop, each of said priority modules further comprising:

a first acknowledgement gate, the first acknowledgement gates of all modules being connected in series in said order of priority to transmit an acknowledgement signal from the highest priority module toward lower order priority modules, a second acknowledgement gate enabled by said request flip-flop when it is set, an acknowledgement pulse from a higher priority module being applied through said second acknowledgement gate to set said acknowledgement flip-flop, the output of said acknowledgement flip-flop being connected to said first acknowledgement gate to block transmission of said acknowledgement pulse to lower order priority modules, the receipt of an acknowledgement pulse in a priority module having an acknowledgement flip-flop which is set being effective to enable the encoder in that priority module.

4. The system recited in claim 3 wherein said computer generates a clear signal after it has serviced a peripheral unit requesting service, each of said priority modules further comprising:

a clear gate, the clear gates of successive priority modules being connected in series to transmit a clear pulse through successive priority modules, said acknowledgement flip-flop in each module being connected to inhibit transmission of a clear pulse to lower priority modules, said clear signal being connected to reset the acknowledgement flip-flops of each priority module receiving a clear signal.

* * * * *